(12) United States Patent
Huang

(10) Patent No.: US 10,261,550 B2
(45) Date of Patent: Apr. 16, 2019

(54) TOUCHPAD SUPPORTING STRUCTURE FOR SUPPORTING TOUCHPAD

(71) Applicant: Quanta Computer Inc., Taoyuan (TW)

(72) Inventor: Shun-Hsien Huang, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 247 days.

(21) Appl. No.: 15/262,187

(22) Filed: Sep. 12, 2016

(65) Prior Publication Data
US 2018/0074608 A1   Mar. 15, 2018

(51) Int. Cl.
*G06F 1/16* (2006.01)

(52) U.S. Cl.
CPC .................................. *G06F 1/169* (2013.01)

(58) Field of Classification Search
None
See application file for complete search history.

(56) References Cited

U.S. PATENT DOCUMENTS

| | | | |
|---|---|---|---|
| 6,751,089 B2* | 6/2004 | Hsieh | G06F 1/1616 235/472.01 |
| 6,859,355 B2* | 2/2005 | Chuang | G06F 1/169 345/158 |
| 7,102,878 B2* | 9/2006 | Yu | G06F 1/1616 361/679.09 |
| RE40,323 E* | 5/2008 | Bae | G06F 1/1616 345/157 |
| 8,456,437 B2* | 6/2013 | Chiang | G06F 3/03547 178/18.03 |
| 8,581,858 B2* | 11/2013 | Bender | G06F 3/03547 178/18.03 |
| 8,803,852 B2* | 8/2014 | Tsai | G06F 3/03547 345/173 |
| 8,908,361 B2* | 12/2014 | Hoshi | G06F 1/181 361/679.08 |
| 9,069,394 B2* | 6/2015 | Clayton | G06F 3/03547 |
| 9,110,638 B2* | 8/2015 | Yang | G06F 1/169 |
| 9,536,683 B2* | 1/2017 | Ho | H01H 3/12 |
| 9,632,538 B2* | 4/2017 | Chen | G06F 1/1637 |
| 9,645,615 B2* | 5/2017 | Lee | G06F 1/1656 |
| 9,829,932 B2* | 11/2017 | Degner | G06F 1/1616 |
| 9,851,754 B2* | 12/2017 | Abe | G06F 1/1633 |

(Continued)

*Primary Examiner* — Joseph R Haley
*Assistant Examiner* — Karin Kiyabu
(74) *Attorney, Agent, or Firm* — McClure, Qualey & Rodack, LLP

(57) ABSTRACT

Described herein is a structure for supporting a touchpad, including: a frame body having an upper and lower surfaces and an opening, in which the opening including a main edge and an adjacent side edge, wherein the side edge has an indention; a supporting component for supporting the touchpad in the opening, wherein the supporting component has a connecting and an opposite distal ends, and the connecting end connects to a connecting element, which connects to the lower surface adjacent to the main edge, and the supporting component extends toward the upper surface formed an angle with the upper surface, and has a protruding part corresponding to the indention and fitting in the indention; a blocking member disposed on the frame body and blocking the indention; wherein the protruding part is blocked by the blocking member so as to make the distal end lower than the upper surface.

10 Claims, 8 Drawing Sheets

(56) References Cited

U.S. PATENT DOCUMENTS

| | | | |
|---|---|---|---|
| 9,891,668 B2* | 2/2018 | Abe | G06F 1/1633 |
| 9,891,674 B2* | 2/2018 | Regimbal | G06F 1/169 |
| 9,937,690 B2* | 4/2018 | Lin | G06F 1/1626 |
| 9,958,907 B2* | 5/2018 | Kitamura | G06F 1/169 |
| 10,000,879 B2* | 6/2018 | Kwon | D06F 39/005 |
| 10,006,159 B2* | 6/2018 | Kwon | D06F 39/005 |
| 10,061,361 B2* | 8/2018 | Degner | G06F 1/1616 |
| 10,126,783 B2* | 11/2018 | Farahani | G06F 1/1637 |
| 10,133,314 B2* | 11/2018 | Farahani | G06F 1/1662 |
| 10,161,076 B2* | 12/2018 | Kwon | D06F 39/005 |
| 2002/0048155 A1* | 4/2002 | Chiang | G06F 1/1616 |
| | | | 361/747 |
| 2004/0057195 A1* | 3/2004 | Hsieh | G06F 1/1616 |
| | | | 361/679.09 |
| 2006/0007167 A1* | 1/2006 | Shih | G06F 1/1616 |
| | | | 345/173 |
| 2008/0266775 A1* | 10/2008 | Song | G06F 1/1616 |
| | | | 361/679.22 |
| 2009/0174678 A1* | 7/2009 | Mathew | G06F 1/1616 |
| | | | 345/173 |
| 2009/0302722 A1* | 12/2009 | Mihara | G06F 1/1616 |
| | | | 312/223.2 |
| 2010/0300770 A1* | 12/2010 | Bender | G06F 3/03547 |
| | | | 178/18.03 |
| 2011/0075336 A1* | 3/2011 | Chiang | G06F 1/169 |
| | | | 361/679.02 |
| 2011/0080354 A1* | 4/2011 | Chiang | G06F 3/03547 |
| | | | 345/173 |
| 2011/0088838 A1* | 4/2011 | Thompson | B29C 66/944 |
| | | | 156/273.3 |
| 2011/0149534 A1* | 6/2011 | Hamada | G06F 1/169 |
| | | | 361/756 |
| 2011/0249383 A1* | 10/2011 | Horii | G06F 1/169 |
| | | | 361/679.01 |
| 2013/0074305 A1* | 3/2013 | Tolentino | B24C 1/10 |
| | | | 29/407.05 |
| 2013/0322026 A1* | 12/2013 | Huang | H05K 7/02 |
| | | | 361/728 |
| 2014/0313648 A1* | 10/2014 | Yang | G06F 1/169 |
| | | | 361/679.01 |
| 2015/0160692 A1* | 6/2015 | Chen | G06F 1/1637 |
| | | | 29/464 |
| 2015/0169005 A1* | 6/2015 | Yanagida | G06F 1/169 |
| | | | 345/173 |
| 2016/0147328 A1* | 5/2016 | Doi | G06F 1/169 |
| | | | 345/157 |
| 2016/0154427 A1* | 6/2016 | Sun | G06F 1/169 |
| | | | 312/223.2 |
| 2017/0031484 A1* | 2/2017 | Kim | G06F 3/044 |
| 2017/0038801 A1* | 2/2017 | Lee | G06F 1/1656 |
| 2017/0121884 A1* | 5/2017 | Kwon | D06F 39/005 |
| 2017/0121888 A1* | 5/2017 | Kwon | D06F 39/005 |
| 2017/0121889 A1* | 5/2017 | Kwon | D06F 39/005 |
| 2017/0228093 A1* | 8/2017 | Li | G02F 1/13338 |
| 2017/0255230 A1* | 9/2017 | Regimbal | G06F 1/169 |
| 2017/0274635 A1* | 9/2017 | Lin | G06F 1/1626 |
| 2018/0232072 A1* | 8/2018 | Huang | G06F 1/1684 |

\* cited by examiner

TOUCHPAD SUPPORTING STRUCTURE FOR SUPPORTING TOUCHPAD

BACKGROUND OF THE INVENTION

1. Field of the Invention

The present invention relates to a touchpad supporting structure and, more specifically, relates to a touchpad supporting structure having a blocking element to limit the supporting component exerted by a resilient force.

2. Description of the Related Art

Usually, laptops come with a touchpad, which serves as a pointer device. The touchpad is generally disposed with two buttons, namely left and right buttons, which are equivalent to a standard mouse's left and right buttons. Conventionally, these buttons are configured to be supported by an elastic force and, therefore, while pressing on these buttons, the force reacts to the user with a push-back feeling, which assures the user that the action of the pressing is completed.

After being clicked and clicked for a period of time, these buttons might lose its ability to respond an acceptable feeling, or worse, to return to its original position. The cause of these is generally resulted from a failure combination of a structure design and a decent supporting resilient element.

SUMMARY OF THE INVENTION

To solve the aforementioned technical problem, an objective of this invention is to provide a durable touchpad supporting structure with decent push-back feeling.

In order to fulfill the said purpose, the present invention provides a touchpad supporting structure for supporting a touchpad, including: a frame body having an upper surface, a lower surface, and an opening passing through the upper surface and the lower surface, in which the opening including a main edge and an adjacent side edge, of which the side edge has an indention; a supporting component disposed within the opening for supporting the touchpad in the opening, wherein the supporting component has a connecting end and a distal end opposite to each other, and the connecting end connects to a connecting element, which connects to the lower surface adjacent to the main edge, and the supporting component extends toward the upper surface with a direction formed an angle with the upper surface, and the supporting component has a protruding part corresponding to the indention and fitting in the indention; and a blocking member disposed on the frame body and blocking the indention; wherein the protruding part is blocked by the blocking member so as to make the distal end lower than the upper surface.

Preferably, a metal layer can be disposed on the upper surface of the frame body, and a part of the metal layer which covers the indention forms the blocking member.

Preferably, the material of the metal layer can include aluminum.

Preferably, the material of the frame body can include plastic.

Preferably, the thickness of the frame body can be equal to or less than 3 mm.

Preferably, the material of the blocking member and the material of the frame body can be the same.

Preferably, the connecting element can be a resilient arm including the same material as the frame body.

Preferably, the material of the connecting element and the material of the connecting element can be the same as the material of the frame body.

Preferably, the supporting component and the frame body can be integrally formed by injection molding.

Preferably, the angle can be less than 5°.

DESCRIPTION OF THE PREFERRED EMBODIMENTS

The present invention has been described with some preferred embodiments thereof and it is understood that many changes and modifications in the described embodiments can be carried out without departing from the scope and the spirit of the invention that is intended to be limited only by the appended claims.

Figure 1:
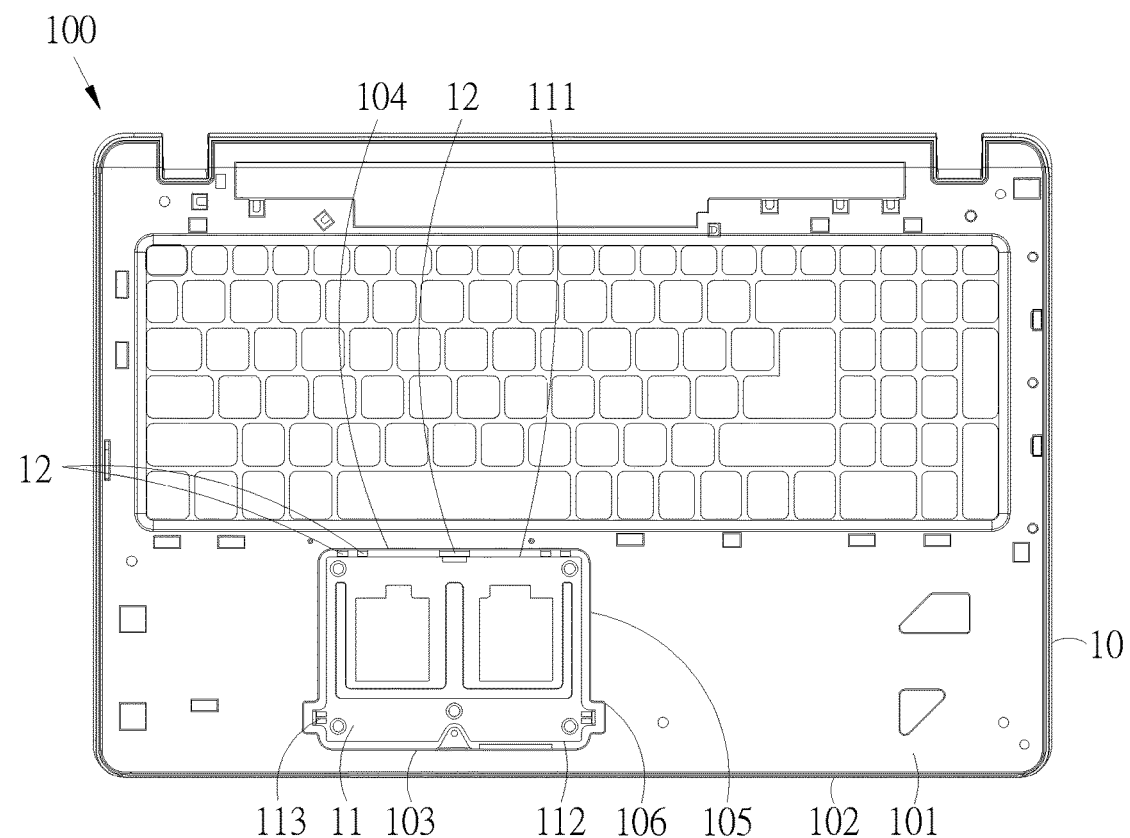
FIG. 1 shows the front-side view of a laptop touchpad supporting structure according to the first embodiment of the present invention.

FIG. 1 is the front-side view of a laptop touchpad supporting structure 100 according to the first embodiment of the present invention. As shown in FIG. 1, the touchpad supporting structure 100 includes a frame body 10 and a supporting component 11. The frame body 10 is made of, but not limited to, plastic and is divided into a couple of zones for the installation of keys, a touchpad, and other functional elements. The thickness of the frame body 10 is customizable. However, while the thickness is less than 3 mm, an extra enforcement will be needed to maintain the integrity of the structure. So, the pressing on the keys or the touchpad would not cause the deformation of the frame body 10.

The frame body 10 is defined with an upper surface 101 and a lower surface 102 and includes an opening 103 passing through the upper and the lower surfaces 101 and 102. The opening 103 has a main edge 104 and an adjacent side edge 105. On the side edge 105, there is an indention 106.

The supporting component 11 is connected to the frame body 10 and is used to support a touchpad 15 (shown in FIG.

10). The supporting component 11 is generally a rectangular plate made of plastic. If both the supporting component 11 and the frame body 10 are made of the same material, they can be integrally formed, e.g. formed by injection molding. In order to support a touchpad decently, the connection between the frame body 10 and the supporting component 11 should provide enough elastical force and be durable for long term uses as well.

Figure 2:
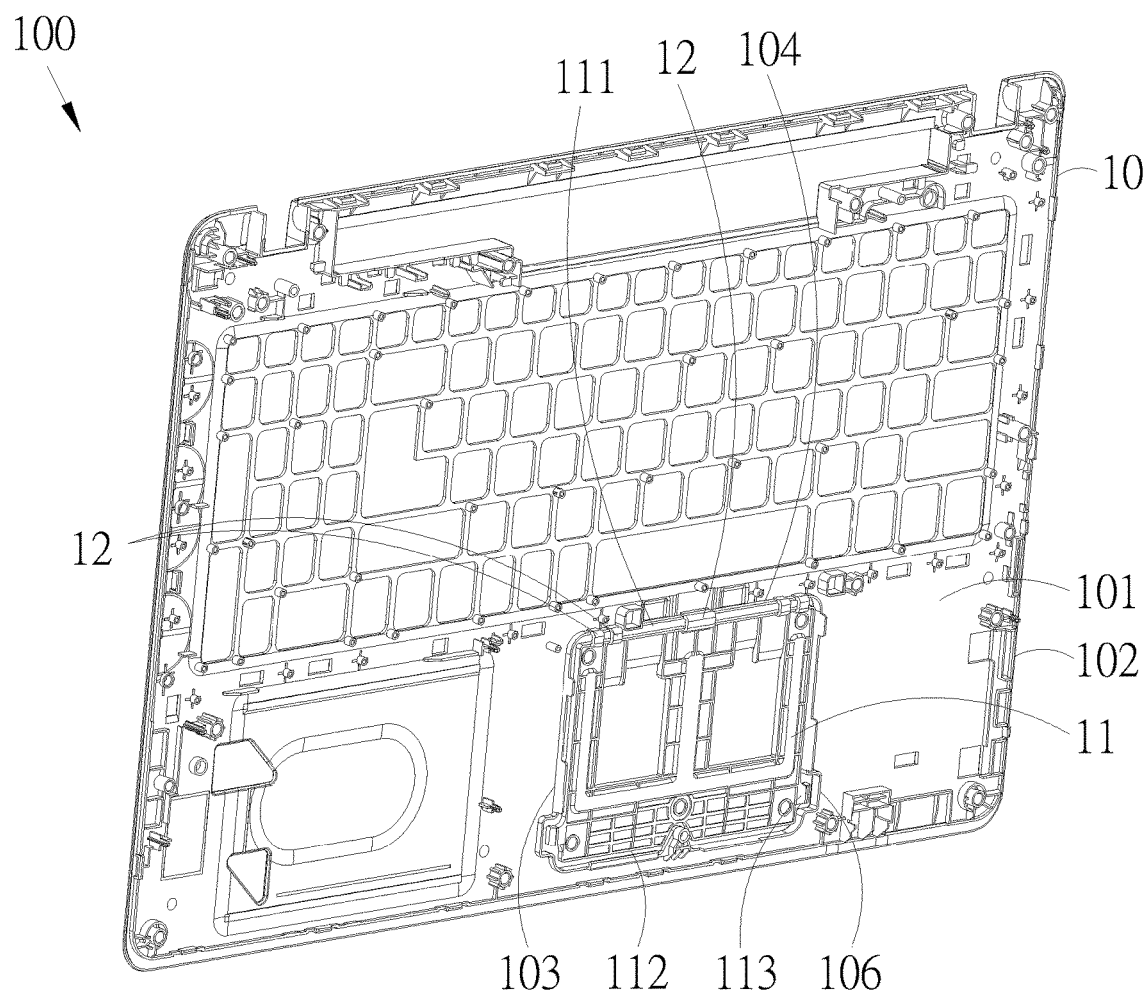
FIG. 2 shows the back-side view of a laptop touchpad supporting structure with a connecting element according to the first embodiment of the present invention.

FIG. 2 shows the back-side view of a laptop touchpad supporting structure 100 with a connecting element 12 according to the first embodiment of the present invention. As shown in FIG. 2, the supporting component 11 has a connecting end 111 and a distal end 112 opposite to each other. One side of the connecting element 12 connects to the connecting end 111 of the supporting component 11, while the other side connects to the lower surface 102 adjacent to the main edge 104, which provides a large and adjustable connecting area. Since the size and the connecting area of the connecting element 12 define the magnitude of the elastic force exerting on the supporting component 11, the lower surface 102 connection adjacent to the main edge 104 provides a stronger, adjustable force onto the supporting component 11.

The material of the connecting element 12 can be the same as the supporting component 11 and the frame body 10. They can be integrally formed by injection molding and, in this case, the connecting element 12 can be a resilient arm. By controlling the size and the connecting area, the desired pressing feeling responded by the elastic force can be achieved.

Figure 3:
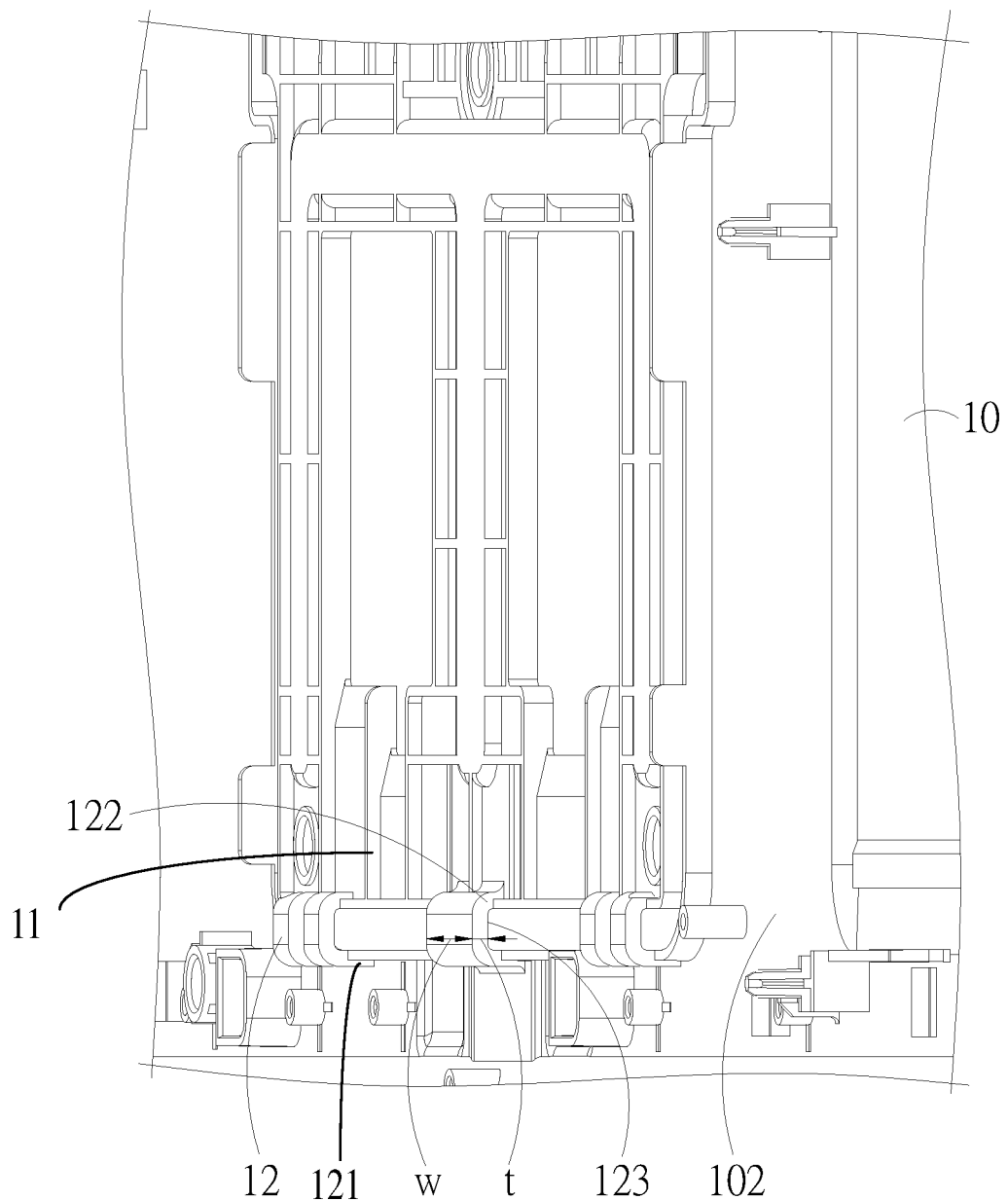
FIG. 3 shows a close-up view of the connecting element of the present invention.

FIG. 3 shows a close-up view of the connecting element 12 of the present invention. As shown in FIG. 3, the connecting element 12 can be an U-shaped structure, including the first vertical portion 121, which connects to the lower surface 102 of the frame body 10, the second vertical portion 122, which connects to the supporting component 11, and a horizontal portion 123, which is disposed between and connected to the first vertical portion 121 and the second vertical portion 122. In order to increase the elastic force exerting on the supporting component 11, the ratio of the thickness t to the width w can range from 1:1 to 1:3, and the number of the connecting element 12 can be an odd number, such as 5 connecting elements 12 shown in FIG. 3, but the number can also be 3, 5, 7, and etc. The odd number of the connecting elements 12 with symmetrical arrangement related to the connecting element 12 at the center of the connecting end 111 of the supporting component 11 can ensure the uniformity of the elastic force exerting on the supporting component 11. In addition, the ratio of thickness t to width w of the center connecting element 12 can be the smallest among all the connecting elements 12 to ensure the pressing feeling gradually changed from the center to the edge of the supporting component 11.

Referring back to FIG. 1, since the connecting end 111 of the supporting component 11 connects to the connecting element 12, which connects to the frame body 10, the force provided by the connecting element 12 to the supporting component 11 pushes the supporting component 11 to tilt and, as a result, the distal end 112 of the supporting component 11 protrudes through the opening 103 to a higher level than the upper surface 101. The more elastic force provided by the connecting element 12, the higher level the distal end 112 has.

As shown in FIG. 1 and FIG. 2, the supporting component 11 has a protruding part 113 corresponding to the indention 106 of the frame body 10. The protruding part 113 is smaller than the indention 106 to allow it passing through the indention 106 under the force provided by the connecting element 12.

Figure 4:
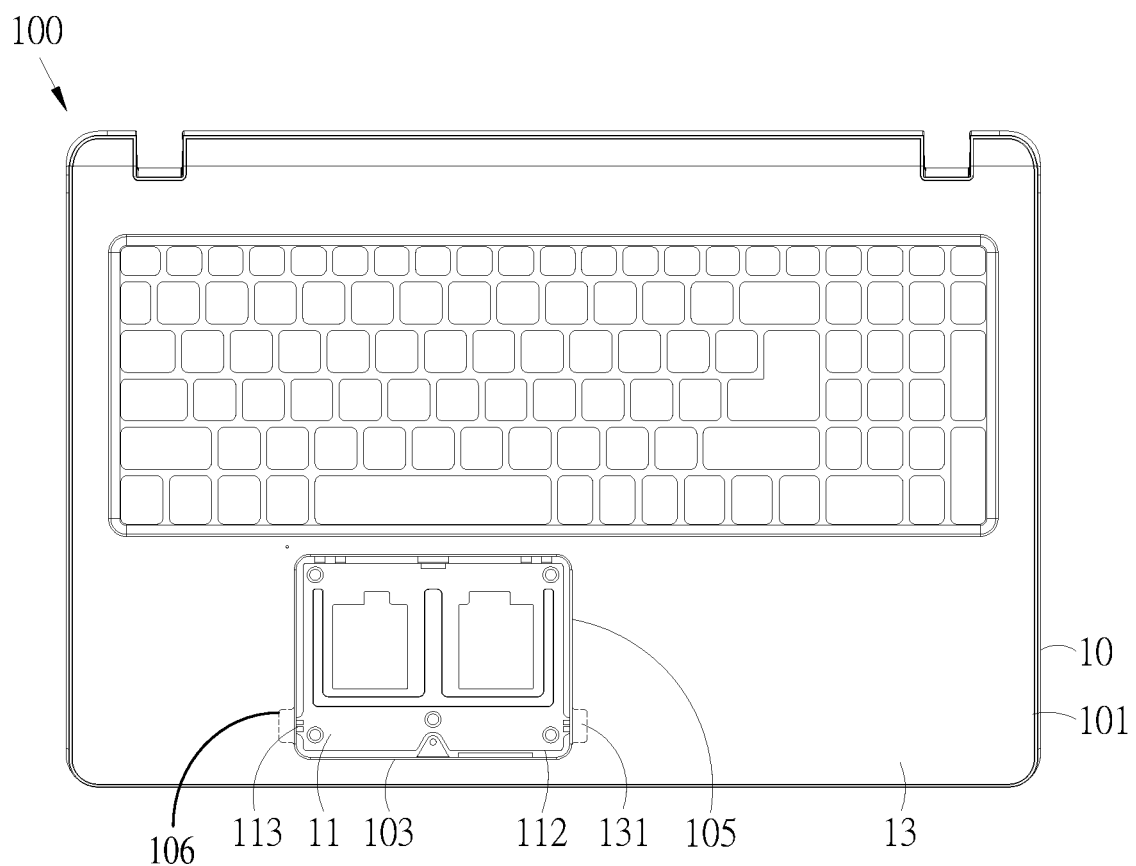
FIG. 4 shows the front-side view of a laptop touchpad supporting structure attached with a metal layer according to the first embodiment of the present invention.
Figure 5:
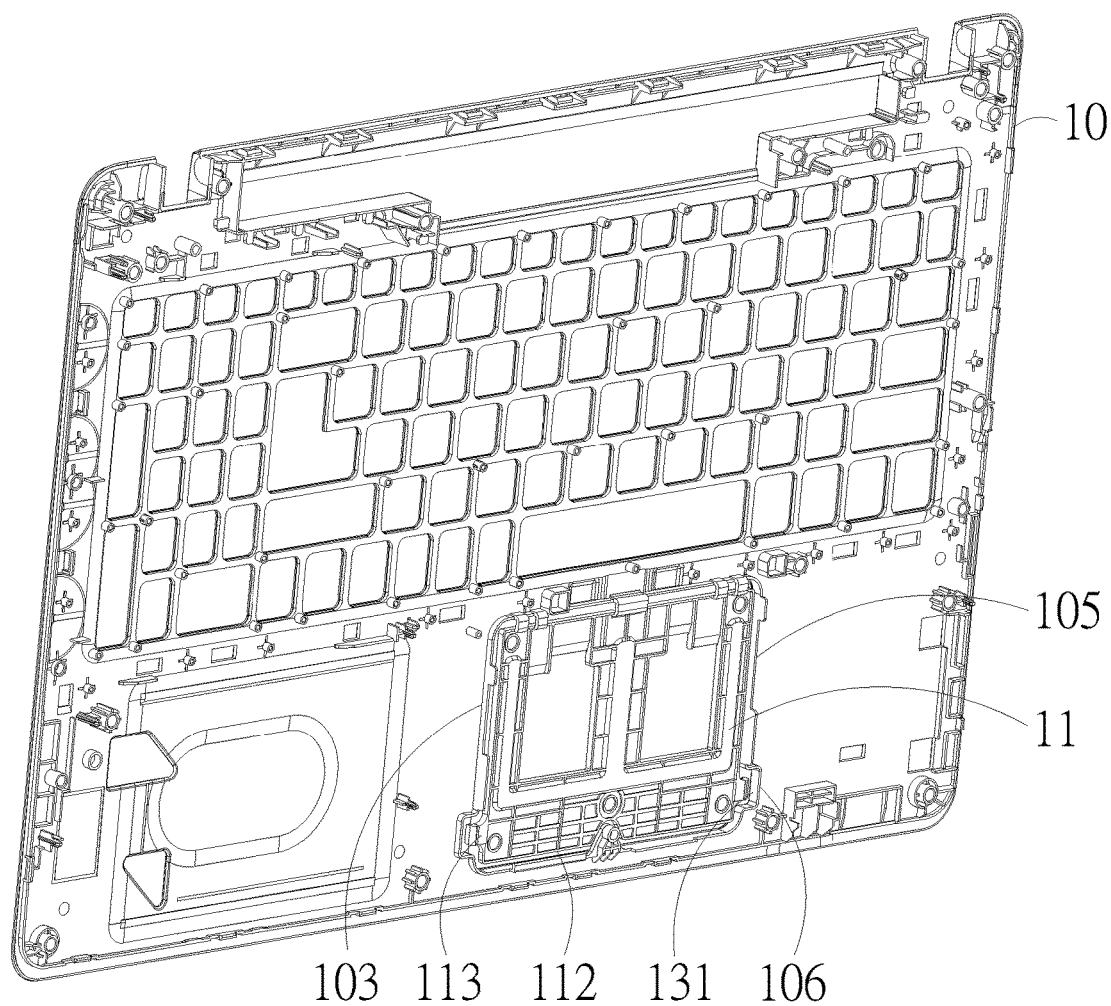
FIG. 5 shows the back-side view of a laptop touchpad supporting structure attached with a metal layer according to the first embodiment of the present invention.
Figure 6:
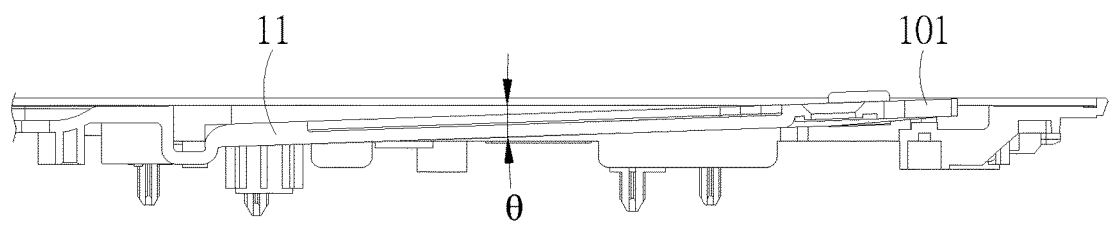
FIG. 6 shows the cross-sectional view of a laptop touchpad supporting structure according to the first embodiment of the present invention.

FIG. 4 and FIG. 5 show a laptop touchpad supporting structure 100 attached by a metal layer 13 according to the first embodiment of the present invention. FIG. 4 provides the front-side view, and FIG. 5 provides the back-side view. As shown in FIG. 4 and FIG. 5, a metal layer 13, which can be made of aluminum, aluminum alloy, steel, brass, titanium, or other suitable material such as plastic or carbon fiber, is provided on and attached to the upper surface 101 of the frame body 10. The metal layer 13 is provided to enhance the integrity of the frame body 10. In addition, the metal layer 13 covers the indention 106 on the side edge 105 of the opening 103 of the frame body 10. The portion of the metal layer 13 covering the indention 106 serves as a blocking member 131 to block the protruding part 113 of the supporting component 11 and, therefore, the supporting component 11 is pushed back to ensure the distal end 112 of the supporting component 11 lower than the upper surface 101 of the frame body 10. As shown in FIG. 6, while being blocked, the supporting component 11 extends toward the upper surface 101 and is forming an angle θ with the upper surface 101. The angle θ is less than 5° or, preferably, is equal to or greater than 0° and less than 3°.

Figure 7:
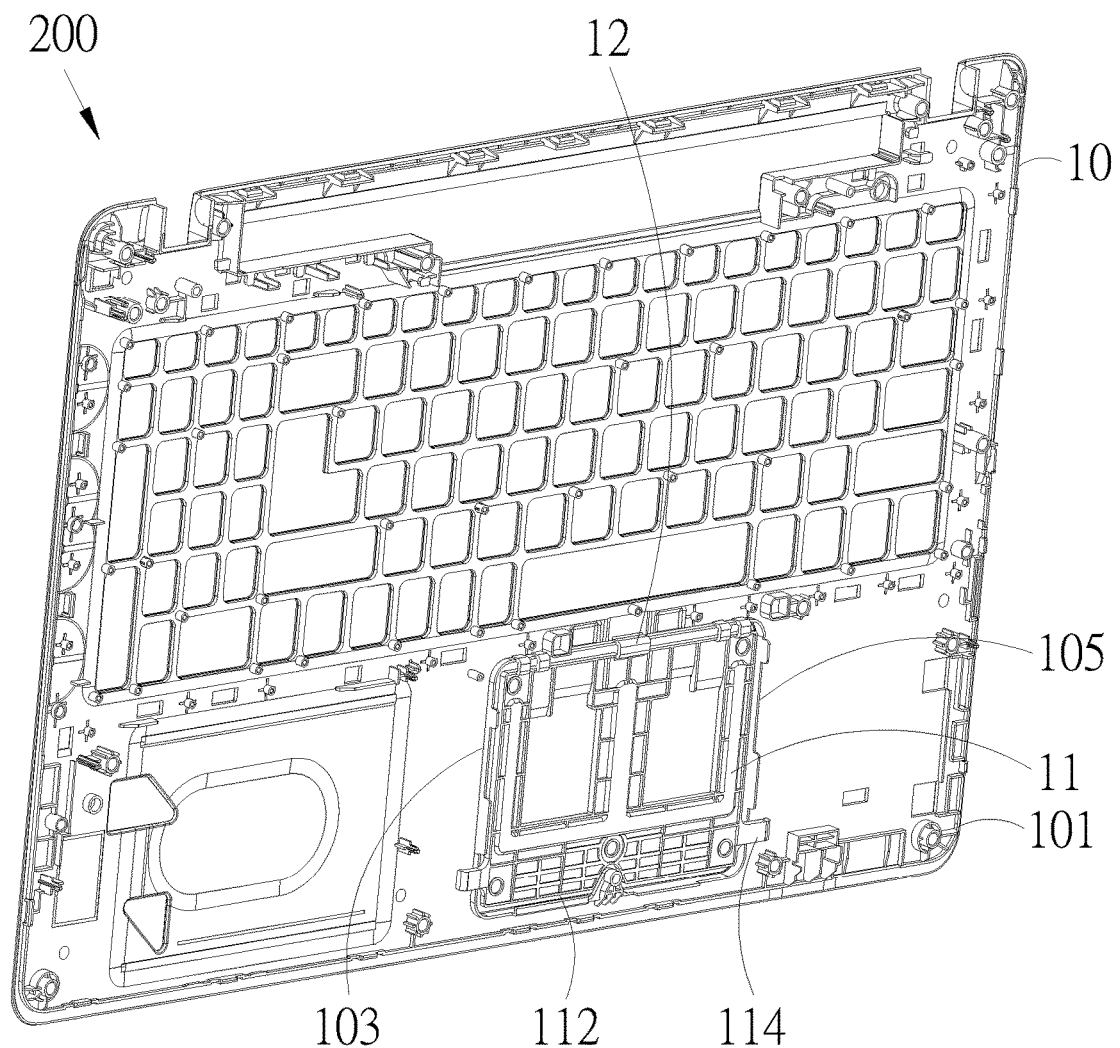
FIG. 7 shows the back-side view of a laptop touchpad supporting structure according to the second embodiment of the present invention.

FIG. 7 shows the back-side view of a laptop touchpad supporting structure 200 according to the second embodiment. The blocking design in this embodiment is different from the one in the first embodiment. As shown in FIG. 7, there is no indention 106 at the side edge 105 of the opening 103 of the frame body 10. Instead, after forming the frame body 10, the supporting component 11, and the connecting element 12 integrally by injection molding, the distal end 112 is higher than the upper surface 101 of the frame body 10. In order to push it back, an extra protruding part 114 is formed on the side edge of the supporting component 11. The extra protruding part 114 has a length extending to overlap the lower surface 102 of the frame body 10. Although it is pushed by the elastic force exerted by the connecting element 12, the supporting component 11 is blocked by the lower surface 102 because of the extra protruding part 114.

Figure 8:
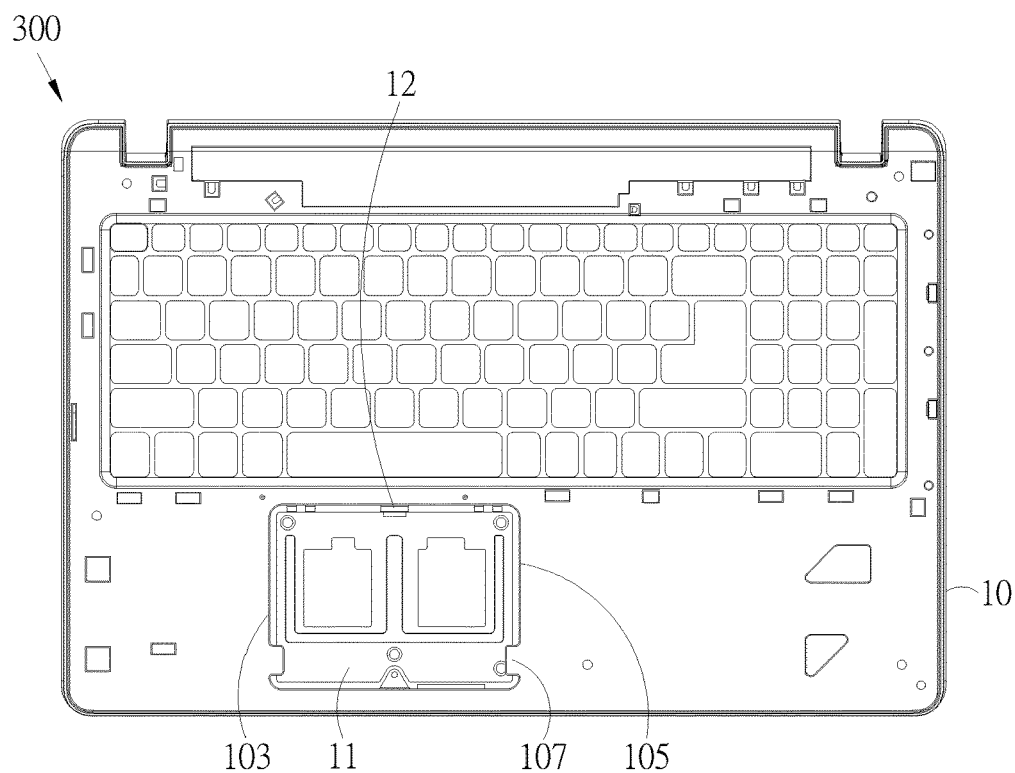
FIG. 8 shows the front-side view of a laptop touchpad supporting structure according to the third embodiment of the present invention.

FIG. 8 shows the front-side view of a laptop touchpad supporting structure 300 according to the third embodiment. The blocking design in the third embodiment is different from the ones in the first and second embodiments. As shown in FIG. 8, there is no indention 106 at the side edge 105 of the opening 103 of the frame body 10 and there is no protruding part 113 or extra protruding part 114 formed on the side edge of the supporting component 11, either. Instead, the frame body 10 has a protrusion 107, but not limited to one, formed on the side edge 105 of the opening 103, formed on both side edges 105 of the opening 103, formed on the side opposite to the main edge 104, or their combination. The protrusion 107 has a length extending to overlap the supporting component 11. Although it is pushed by the elastic force exerted by the connecting element 12, the supporting component 11 is blocked by the protrusion 107 of the frame body.

Figure 9:
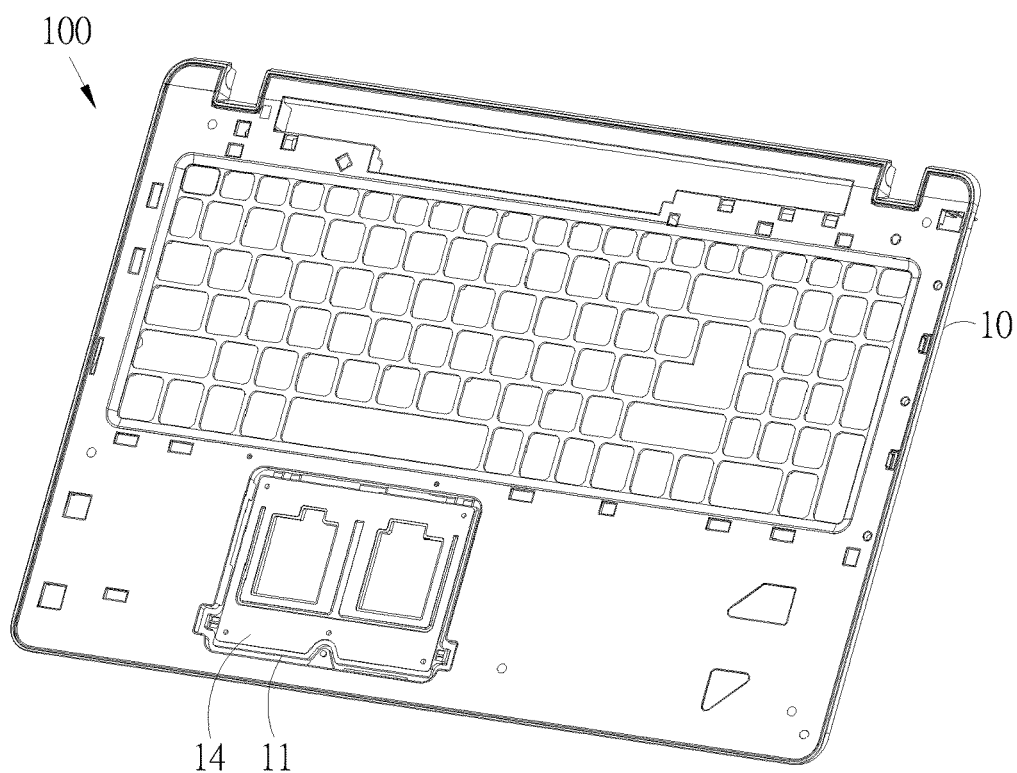
FIG. 9 shows the front-side view of a laptop touchpad supporting structure attached with a bracket according to each embodiment of the present invention.
Figure 10:
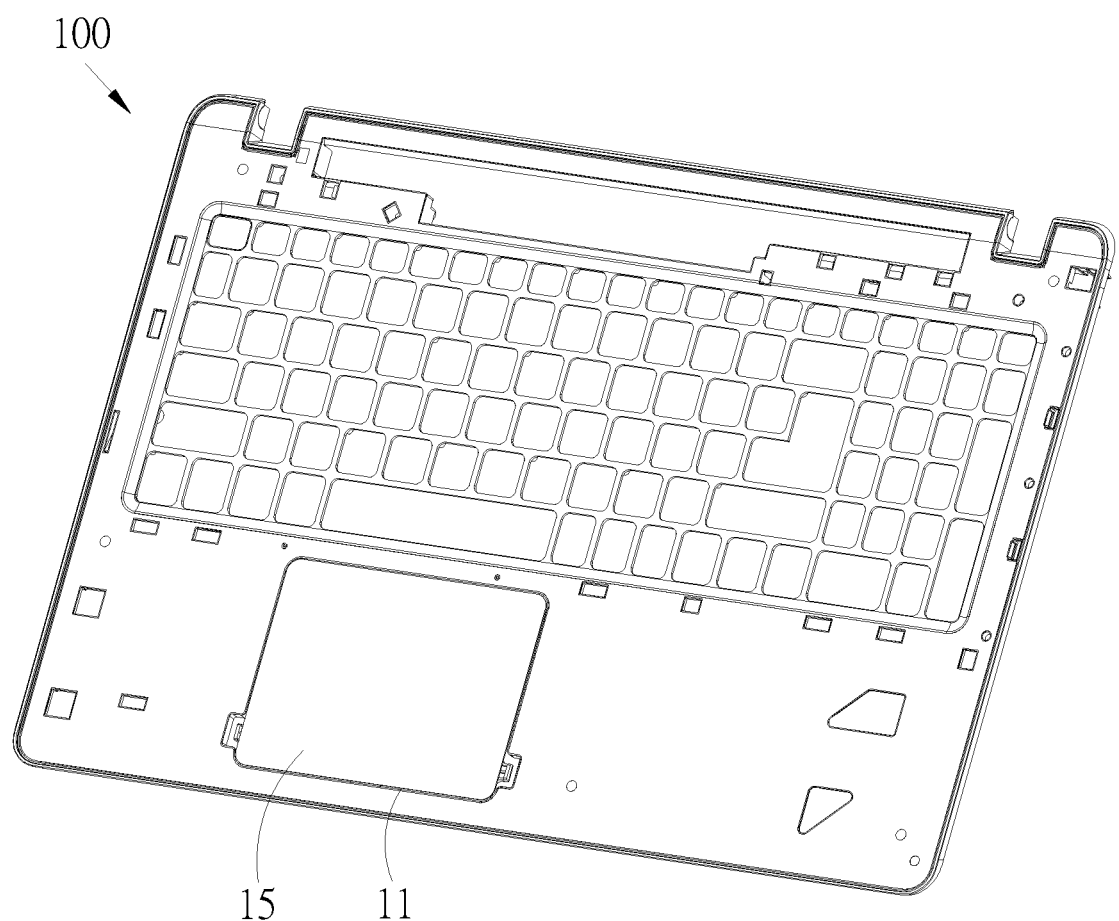
FIG. 10 shows the front-side view of a laptop touchpad supporting structure attached with a touchpad according to each embodiment of the present invention.

FIG. 9 and FIG. 10 show the front-side view of a laptop touchpad supporting structure 100 attached with a bracket 14 and a touchpad 15 according to each aforementioned embodiments of the present invention. As shown in FIG. 9, a bracket 14, which serves as fixation means for the atop touchpad 15, is attached to the supporting component 11 before or after the blocking of the supporting component 11. In another embodiment, if there is no extra protruding part 114 of the supporting component 11 in the second embodiment, the bracket 14 can be designed to provide the function by including at least one protruding portion having a length extending to overlap the frame body 10, similar to extra protruding part 114 in FIG. 7, on the edges of the bracket 14. Therefore, after fixing the bracket 14 on the supporting component 11, although it is pushed by the elastic force exerted by the connecting element 12, the supporting component 11 is blocked by the protruding portion of the bracket 14.

As shown in FIG. 10, finally, a touchpad 15 is installed on and supported by the supporting component 11 with or without the middle bracket 14 as shown in FIG. 9.

The aforementioned embodiments provide touchpad supporting structures 100, 200, or 300 with acceptable pressing feeling and durability. The pressing feeling is defined by two feature factors: the pressing distance, which is the distance measured from the original position of the touchpad 15 to the position that an action switch is touched while pressing the touchpad 15, and pressing force, which is required force to press the touchpad 15.

For the factor of the pressing distance, too long or too short of it results to that the user can't distinguish whether if an effective pressing is performed. This factor is related to the position of the connecting element 12 and the angle of the supporting component 11. While the connecting element 12 and the angle are configured according the embodiments, the pressing distance can be in the range from 0.1 mm to 0.6 mm.

For the factor of the pressing force, the factor is related to the connecting element 12. While the connecting element 12 is configured according the embodiments, the factor can be more achievable by adjusting the size, the position, and the number of it to meet the requirement, e.g. 450 g±10%.

What is claimed is:

1. A touchpad supporting structure for supporting a touchpad, comprising:
   a frame body having an upper surface, a lower surface, and an opening passing through the upper surface and the lower surface, in which the opening comprising a main edge and an adjacent side edge, wherein the adjacent side edge has an indention;
   a supporting component disposed within the opening for supporting the touchpad which is in the opening, wherein the supporting component has a connecting end and a distal end opposite to each other, and the supporting component extends toward the upper surface with a direction formed an angle with the upper surface, and the supporting component has a protruding part corresponding to the indention and fitting in the indention;
   a blocking member disposed on the frame body and blocking the indention; and
   a connecting element with an U-shaped structure, including a first vertical portion connecting to the lower surface of the frame body, a second vertical portion connecting to the supporting component, and a horizontal portion disposed between and connected to the first vertical portion and the second vertical portion;
   wherein the protruding part is blocked by the blocking member so as to make the distal end lower than the upper surface.

2. The touchpad supporting structure according to claim 1, further comprising: a metal layer disposed on the upper surface of the frame body, and a part of the metal layer which covers the indention forms the blocking member.

3. The touchpad supporting structure according to claim 2, wherein a material of the metal layer includes aluminum.

4. The touchpad supporting structure according to claim 2, wherein a material of the frame body includes plastic.

5. The touchpad supporting structure according to claim 2, wherein a thickness of the frame body is equal to or less than 3 mm.

6. The touchpad supporting structure according to claim 1, wherein a material of the blocking member and a material of the frame body are the same.

7. The touchpad supporting structure according to claim 1, wherein the connecting element is a resilient arm having a same material as the frame body.

8. The touchpad supporting structure according to claim 1, wherein a material of the connecting element and a material of the supporting component are the same as a material of the frame body.

9. The touchpad supporting structure according to claim 1, wherein the supporting component and the frame body are integrally formed by injection molding.

10. The touchpad supporting structure according to claim 1, wherein the angle is less than 5°.

* * * * *